(12) United States Patent
Byrne et al.

(10) Patent No.: US 9,148,006 B2
(45) Date of Patent: Sep. 29, 2015

(54) INTERCHANGEABLE BASE SYSTEM

(71) Applicants: Norman R. Byrne, Ada, MI (US);
Daniel P. Byrne, Lowell, MI (US);
Randell E. Pate, Jenison, MI (US)

(72) Inventors: Norman R. Byrne, Ada, MI (US);
Daniel P. Byrne, Lowell, MI (US);
Randell E. Pate, Jenison, MI (US)

( * ) Notice: Subject to any disclaimer, the term of this patent is extended or adjusted under 35 U.S.C. 154(b) by 0 days.

(21) Appl. No.: 14/269,247

(22) Filed: May 5, 2014

(65) Prior Publication Data
US 2014/0326497 A1  Nov. 6, 2014

Related U.S. Application Data

(60) Provisional application No. 61/819,262, filed on May 3, 2013.

(51) Int. Cl.
| | |
|---|---|
| *H05K 7/14* | (2006.01) |
| *H02G 3/18* | (2006.01) |
| *H02G 3/08* | (2006.01) |
| *H02G 3/22* | (2006.01) |

(52) U.S. Cl.
CPC .................. *H02G 3/18* (2013.01); *H02G 3/083* (2013.01); *H02G 3/22* (2013.01)

(58) Field of Classification Search
CPC ....................................................... H02G 3/083
USPC ................. 312/223.6; 439/535; 174/541, 545
See application file for complete search history.

(56) References Cited

U.S. PATENT DOCUMENTS

| | | | |
|---|---|---|---|
| 3,006,589 A | 10/1961 | Drysdale | |
| 3,049,688 A | 8/1962 | Sinoploi | |
| 4,266,266 A | 5/1981 | Sanner | |
| 4,323,723 A | 4/1982 | Fork et al. | |
| 4,453,059 A | 6/1984 | Fukushima | |
| 4,747,788 A | 5/1988 | Byrne | |
| 4,828,513 A | 5/1989 | Morrison et al. | |
| 5,057,039 A | 10/1991 | Persing et al. | |
| 5,130,494 A | 7/1992 | Simonton et al. | |
| 5,195,288 A | 3/1993 | Penczak | |
| 5,230,552 A * | 7/1993 | Schipper et al. ........... | 312/223.6 |
| 5,351,173 A | 9/1994 | Byrne | |
| D355,890 S | 2/1995 | Lentz | |
| 5,404,279 A | 4/1995 | Wood | |
| 5,472,157 A | 12/1995 | Lehrman | |
| 5,501,614 A | 3/1996 | Tsuchiya | |
| 5,709,156 A * | 1/1998 | Gevaert et al. ............. | 108/50.02 |

(Continued)

OTHER PUBLICATIONS

PCT International Search Report and Written Opinion for corresponding PCT Application No. PCT/US2014/036733, dated Aug. 27, 2014.

(Continued)

*Primary Examiner* — Hung V Ngo
(74) *Attorney, Agent, or Firm* — Gardner, Linn, Burkhart & Flory, LLP (57) ABSTRACT

An interchangeable base system is provided for use with an electrical power and/or data unit in a work area or the like. The base system includes a bottom housing portion associated with the electrical unit, with the bottom housing portion having a mechanical receptacle portion. The base system further includes at least two different mounts, each having an engaging portion configured to mate with the receptacle portion, and each having a different distal mounting portion. The different distal mounting portions are configured for mounting to different types of surfaces, so that the electrical unit may be configured for installation in different locations or in different ways.

20 Claims, 10 Drawing Sheets

(56) References Cited

U.S. PATENT DOCUMENTS

| | | | |
|---|---|---|---|
| 5,715,761 A * | 2/1998 | Frattini | 108/50.02 |
| 5,765,932 A * | 6/1998 | Domina et al. | 312/223.6 |
| D413,571 S | 9/1999 | Glass | |
| 5,954,525 A * | 9/1999 | Siegal et al. | 439/131 |
| 5,964,618 A | 10/1999 | McCarthy | |
| 6,004,157 A | 12/1999 | Glass | |
| 6,081,356 A | 6/2000 | Branc et al. | |
| 6,254,427 B1 * | 7/2001 | Stathis | 439/535 |
| 6,379,182 B1 | 4/2002 | Byrne | |
| 6,492,591 B1 | 12/2002 | Metcalf | |
| 6,540,554 B2 | 4/2003 | McCarthy | |
| 6,589,073 B2 | 7/2003 | Lee | |
| 6,619,980 B1 | 9/2003 | Hsiao | |
| D486,793 S | 2/2004 | Gershfeld | |
| 6,689,954 B2 | 2/2004 | Vaughan et al. | |
| 6,717,053 B2 | 4/2004 | Rupert | |
| 6,875,051 B2 | 4/2005 | Pizak | |
| 6,885,796 B2 | 4/2005 | Lubkert et al. | |
| 6,971,911 B2 | 12/2005 | Ramsey et al. | |
| 7,083,421 B1 | 8/2006 | Mori | |
| D535,257 S | 1/2007 | Byrne | |
| 7,223,122 B2 | 5/2007 | Mori | |
| 7,407,392 B2 * | 8/2008 | Cooke et al. | 439/131 |
| 7,488,203 B2 | 2/2009 | Leddusire | |
| 7,736,178 B2 | 6/2010 | Byrne | |
| 7,817,405 B2 * | 10/2010 | Neumann et al. | 361/625 |
| D636,728 S | 4/2011 | Terleski et al. | |
| 7,938,679 B2 | 5/2011 | Wadsworth et al. | |
| 8,901,419 B2 * | 12/2014 | Galasso | 174/53 |
| 2002/0119698 A1 | 8/2002 | McCarthy | |
| 2003/0185515 A1 | 10/2003 | Lubkert et al. | |
| 2003/0186582 A1 | 10/2003 | Laukhuf et al. | |
| 2006/0258195 A1 | 11/2006 | Schwartz et al. | |
| 2007/0247037 A1 * | 10/2007 | Schenker | 312/223.6 |
| 2009/0032660 A1 | 2/2009 | Wadsworth et al. | |
| 2011/0109211 A1 * | 5/2011 | Kirkeby et al. | 312/223.6 |

OTHER PUBLICATIONS

"Desktop Power Center Installation Instructions", Legrand Wiremold, Aug. 2010.

\* cited by examiner

INTERCHANGEABLE BASE SYSTEM

CROSS REFERENCE TO RELATED APPLICATION

The current application claims the benefit of U.S. provisional application Ser. No. 61/819,262, filed May 3, 2013, which is hereby incorporated herein by reference in its entirety.

FIELD OF THE INVENTION

The present invention relates to surface-mountable units for providing electrical power and/or data at or near a work surface and, more particularly, to mounting hardware that is used to secure such units in place.

BACKGROUND OF THE INVENTION

Electrical power units and other devices are commonly located at or near work surfaces, such as tables, desks, wall panels, and the like. Such power units may rest atop a work surface, or may be permanently or temporarily secured to the work surface, or to another nearby surface, via attachment hardware.

SUMMARY OF THE INVENTION

The present invention provides an interchangeable base system for use on electrical power and/or data units or the like, which may be positioned at or along work surfaces, in work areas, or other places where access to electrical power is commonly provided. The interchangeable base system allows a particular power and/or data unit to be customized for a particular type or location of installation, such as along an edge of a desk or table, at an opening formed in a desk or table, or along a wall or other substantially vertical surface, and substantially without modification to the functional portions or the most visible housing portions of the power and/or data unit. The power and/or data units utilizing the interchangeable base system can be originally assembled or configured for one type of installation location or method, and can later be reconfigured for a different installation type or location, with minimal modification and, preferably, without the use of tools.

In one form of the present invention, an interchangeable base system is provided for use with an electrical power and/or data unit that is configured for use in a work area or the like. The base system includes a bottom housing portion or wall associated with the electrical unit, and at least two different mounts, each of which is configured for direct or indirect attachment to the bottom housing portion. The bottom housing portion has a receptacle portion, and the mounts each have an engaging portion for mating with the receptacle portion. The mounts also have respective distal mounting portions, which are different from one another. The different distal mounting portions are configured for mounting to different types of surfaces, so that the electrical unit may be configured for installation in different locations or in different ways, such as along a table edge, through a hole or opening in a table, or along a generally upright surface such as a wall.

According to another form, an interchangeable base system includes a bottom housing portion or wall having a recessed receptacle portion, one or more latch members at the receptacle portion, and first and second mounts having engaging portions that are received in the recessed receptacle portion of the bottom housing portion. The bottom housing portion forms a lower portion of an electrical power and/or data unit, and its recessed receptacle portion is substantially surrounded on all sides by a plurality of sidewalls of the electrical power and/or data unit. The mounts are interchangeably mountable to the bottom housing portion, and have respective distal mounting portions in addition to the engaging portions, which are proximal to the mounting portions. The distal mounting portion of the first mount is configured for a first type of attachment to a mounting surface, such as a hole-mount (for example), and the distal mounting portion of the second mount is configured for a second type of attachment, such as an edge-mount (for example) to the same or a different mounting surface, so that the first type of attachment is different from the second type of attachment. The latch members releasably secure either of the first and second mounts upon engagement of the proximal engaging portion in the recessed receptacle portion of the bottom housing portion. When the distal mounting portion of the first or second mount is coupled to one of the mounting surfaces, and the proximal engaging portion of the first or second mount is secured at the recessed receptacle portion, the recessed receptacle portion and the proximal engaging portion are surrounded by the sidewalls of the electrical power and/or data unit.

In one aspect, the distal mounting portion of the first mount and the distal mounting portion of the second mount are configured for attachment to the first and second work surfaces chosen from (i) a substantially vertical wall, (ii) a work surface edge, (iii) an opening formed in a work surface, and (iv) an elongate channel.

In another aspect, third and fourth mounts are provided, each of which has a proximal engaging portion and a distal mounting portion, so that the distal mounting portions of each of the first, second, third, and fourth mounts are configured for attachment to a respective one chosen from (i) a substantially vertical wall, (ii) a work surface edge, (iii) an opening formed in a work surface, and (iv) an elongate channel.

In still another aspect, the bottom housing portion includes a lower surface that is configured to rest at the mounting surface, such as a desk or table, when the distal mounting portion of the first or second mount is coupled to the mounting surface.

In a further aspect, the latch members include resilient downwardly-extending projections that are configured to engage respective latch surfaces of the proximal engaging surfaces of first and second mounts. The latch members are configured to be manually biased to a disengaging position in which the resilient latch members disengage the respective latch surfaces. Optionally, the latch members are located entirely above the lower surface of the bottom housing portion, and are surrounded on all sides by the sidewalls of the electrical power and/or data unit.

In yet another aspect, the base system is in combination with the electrical power and/or data unit, the electrical power and/or data unit including at least one outlet chosen from (i) a high voltage electrical power outlet, (ii) a low voltage electrical power outlet, (iii) a communications outlet, and (iv) an electronic data outlet. Such an outlet is typically mounted at an opening formed in one of the sidewalls of the electrical power and/or data unit, and so that the sidewalls are coupled to the bottom housing portion.

Optionally, the recessed receptacle portion, the latch members, and the proximal engaging portions are configured to cooperate in such a way as to permit linear insertion and full engagement of the proximal engaging portions with the recessed receptacle portion when securing the first or second mount to the bottom housing portion.

Thus, the interchangeable cover system of the present invention provides a reconfigurable and readily customizable base or mounting system for electrical power and/or data units, which maximizes the number of mounting options available for a given unit, at relatively low cost and with little skill and little time required for reconfiguring a given unit from one type of mount to another. The installed electrical power and/or data units have a clean appearance in which the mount portion is entirely or substantially obscured from view by users in a work area.

These and other objects, advantages, purposes and features of the present invention will become apparent upon review of the following specification in conjunction with the drawings.

DESCRIPTION OF THE PREFERRED EMBODIMENTS

An interchangeable base or mounting system is provided for use with electrical power and/or data units or the like. The base system allows the same (or same type of) power and/or data unit to be configured for various different mounting styles or locations in a space such as a work area. The mounting locations may include, for example, the edge of a desk or table or wall panel, an opening formed in a desk or table or wall panel (i.e., spaced inwardly from a perimeter edge thereof), or along a wall or other generally upright or horizontal surface. The electrical power and/or data unit includes a lower receptacle or receiving portion that may be engaged by various different bases or mounts, all having a substantially similar engaging portion that is securable to the coupler portion of the unit, preferably without tools, and preferably in a manner that facilitates later removal of a base or mount, such as when installing a different base or mount.

Throughout this specification, the terms "upper" or "top", "lower" or "bottom", "front", "back", "over" or "above", and "under" or "below" may be used to denote relative directions for convenience and with reference to the drawings. However, it should be appreciated that such terms are used for clarity of description, and should not be construed as limiting in any way.

Figure 1:
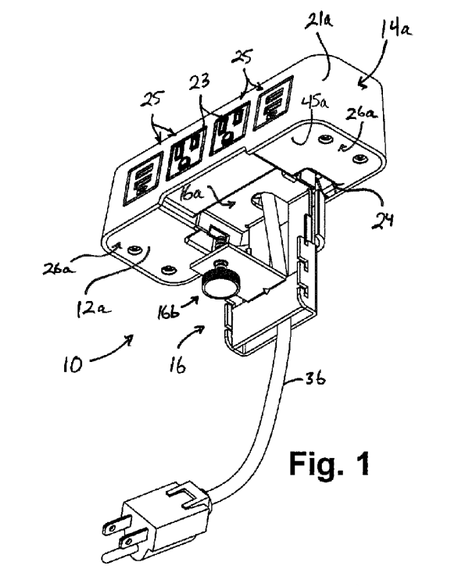
FIG. 1 is a bottom perspective view of an electrical power unit fitted with an edge-mount base in accordance with the present invention.
Figure 2:
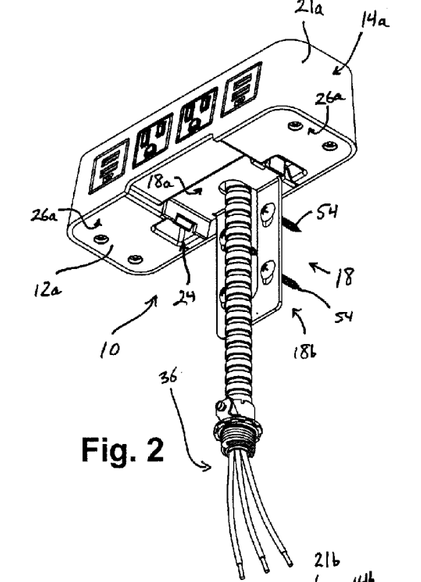
FIG. 2 is a bottom perspective view of the electrical power unit of FIG. 1, fitted with an wall-mount base in accordance with the present invention.
Figure 3:
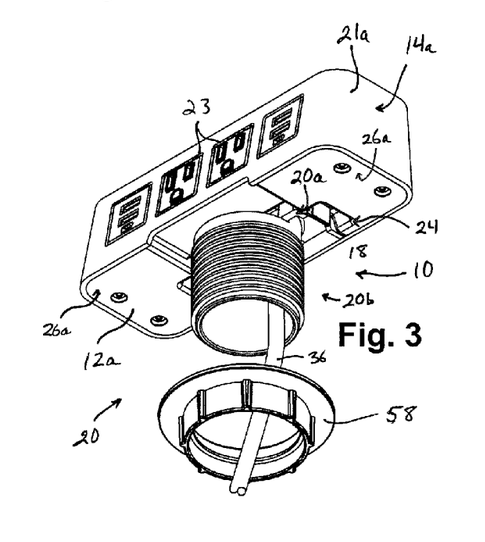
FIG. 3 is a bottom perspective view of the electrical power unit of FIG. 1, fitted with a hole-mount base in accordance with the present invention.
Figure 4:
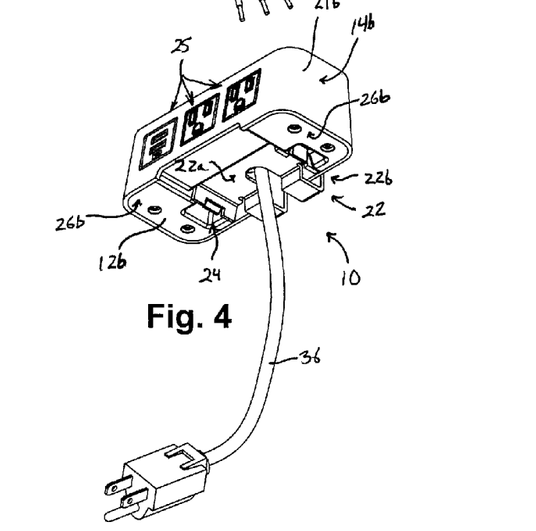
FIG. 4 is a bottom perspective view of another electrical power unit, substantially similar to that of FIG. 1, fitted with a channel-mount base in accordance with the present invention.
Figure 35:
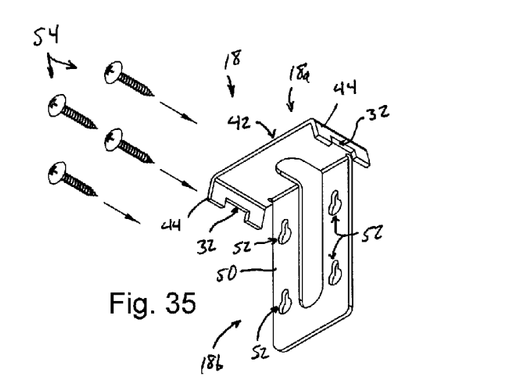
FIG. 35 is an exploded bottom-front perspective view of the wall-mount base of FIG. 2.
Figure 36:
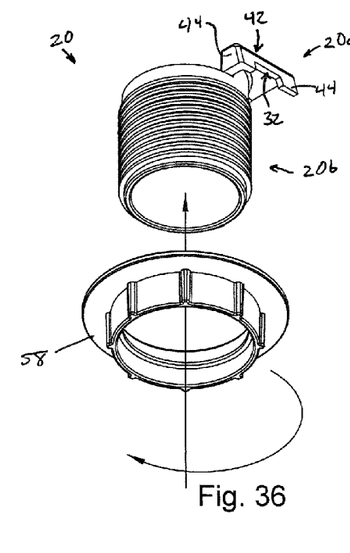
FIG. 36 is an exploded bottom-front perspective view of the hole-mount base of FIG. 3.
Figure 37:
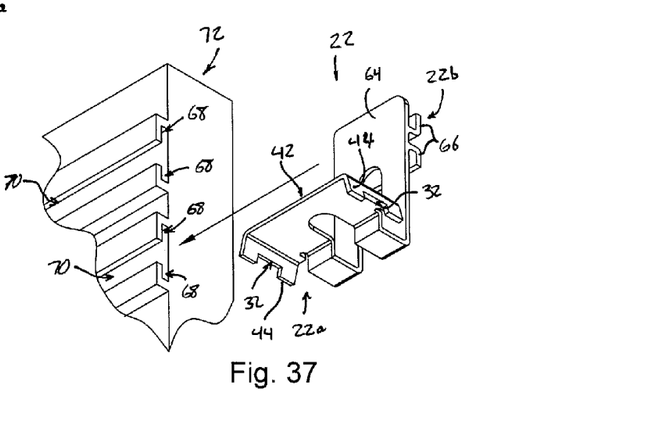
FIG. 37 is a bottom-front perspective view of the channel-mount base of FIG. 4, shown prior to engagement with a channel member.
Figure 38A:
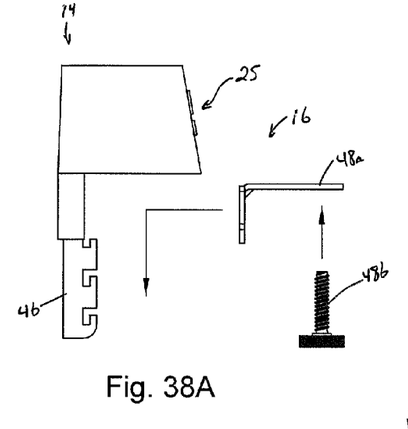
FIG. 38A is a right side elevation of the electrical power unit and edge-mount base of FIG. 1, shown prior to securement of a clamping portion.
Figure 38B:
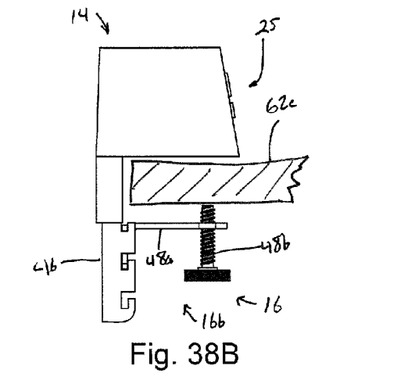
FIG. 38B is a right side elevation of the electrical power unit and edge-mount base of FIG. 1, shown with the clamping portion in an uppermost position along the bracket portion.
Figure 38C:
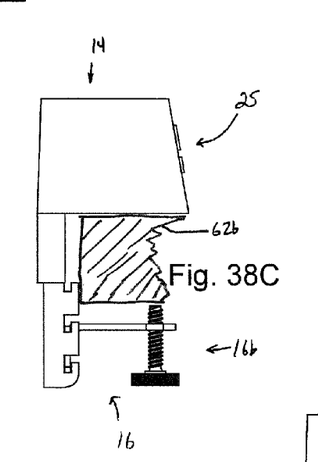
FIG. 38C is a right side elevation of the electrical power unit and edge-mount base of FIG. 1, shown with the clamping portion in a middle position along the bracket portion.
Figure 38D:
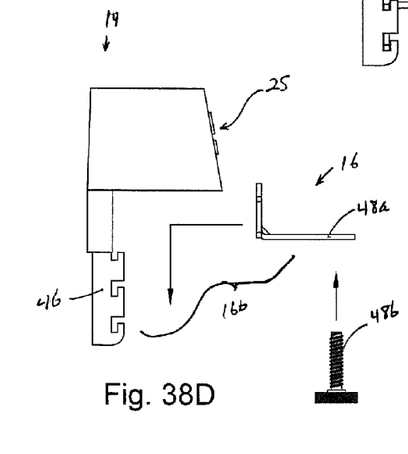
FIG. 38D is a right side elevation of the electrical power unit and edge-mount base of FIG. 1, shown prior to securement of the clamping portion in an inverted orientation.
Figure 38E:
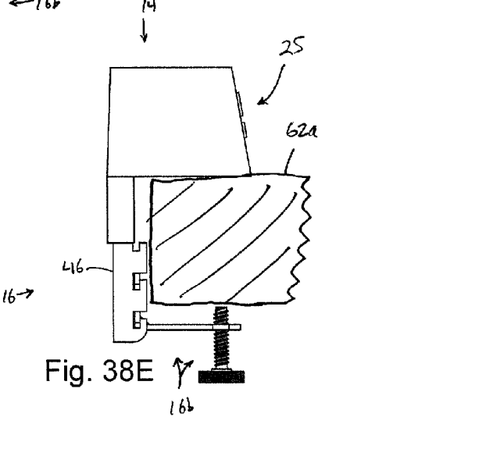
FIG. 38E is a right side elevation of the electrical power unit and edge-mount base of FIG. 1, shown with the clamping portion in a lowermost position along the bracket portion.

Referring now to the drawings and the illustrative embodiments depicted therein, an interchangeable base or mount system 10 includes at least a bottom housing portion 12a-c of a power and/or data unit 14a-c (FIGS. 1-6), plus a plurality of different styles of compatible mounts. For example, the mounts may include a work surface edge mount 16 (FIGS. 1, 35, and 38A-38E), a wall mount 18 (FIGS. 2 and 35), a hole mount 20 (FIGS. 3, 5, 6, 15-22, 29-33C, and 36), and a channel mount 22 (FIGS. 4 and 37). Each bottom housing portion or wall 12a-c is typically coupled to a corresponding upper housing portion 21a-c of electrical unit 14, the upper housing portion 21a-c being made up of a plurality of upstanding sidewalls (which may be unitarily formed, such as shown) that are coupled to and extend upwardly from the corresponding bottom housing portion 12a-c. Upper housing portions 21a-c each define one or more openings 23 where a respective electrical or data outlet 25 is mounted and made accessible. Outlets 25 may include, for example, a high voltage electrical power outlet 25a, a low voltage electrical power outlet such as a universal serial bus (USB) power outlet 25b, a communications outlet such as a phone jack, and an electronic data outlet such as a USB receptacle, an HDMI receptacle, a serial port, or the like.

Each bottom housing portion 12a-c includes a mechanical receptacle or receptacle portion 24 that, in the illustrated embodiments, is substantially the same regardless of the size of bottom housing portion 12a-c and the size or configuration of power and/or data unit 14a-c (which may be collectively referred to hereinafter as "electrical unit 14"). As will be described in more detail below, each of the mounts (16, 18, 20, 22) has a respective proximal engaging portion (16a, 18a, 20a, 22a) and a respective distal mounting portion (16b, 18b, 20b, 22b), with the proximal engaging portions being substantially identical to one another, or at least all being mechanically compatible with receptacle portion 24, and with the distal mounting portions being configured differently so that the electrical units may be secured to various different surfaces or in different locations.

Figures 5, 6:
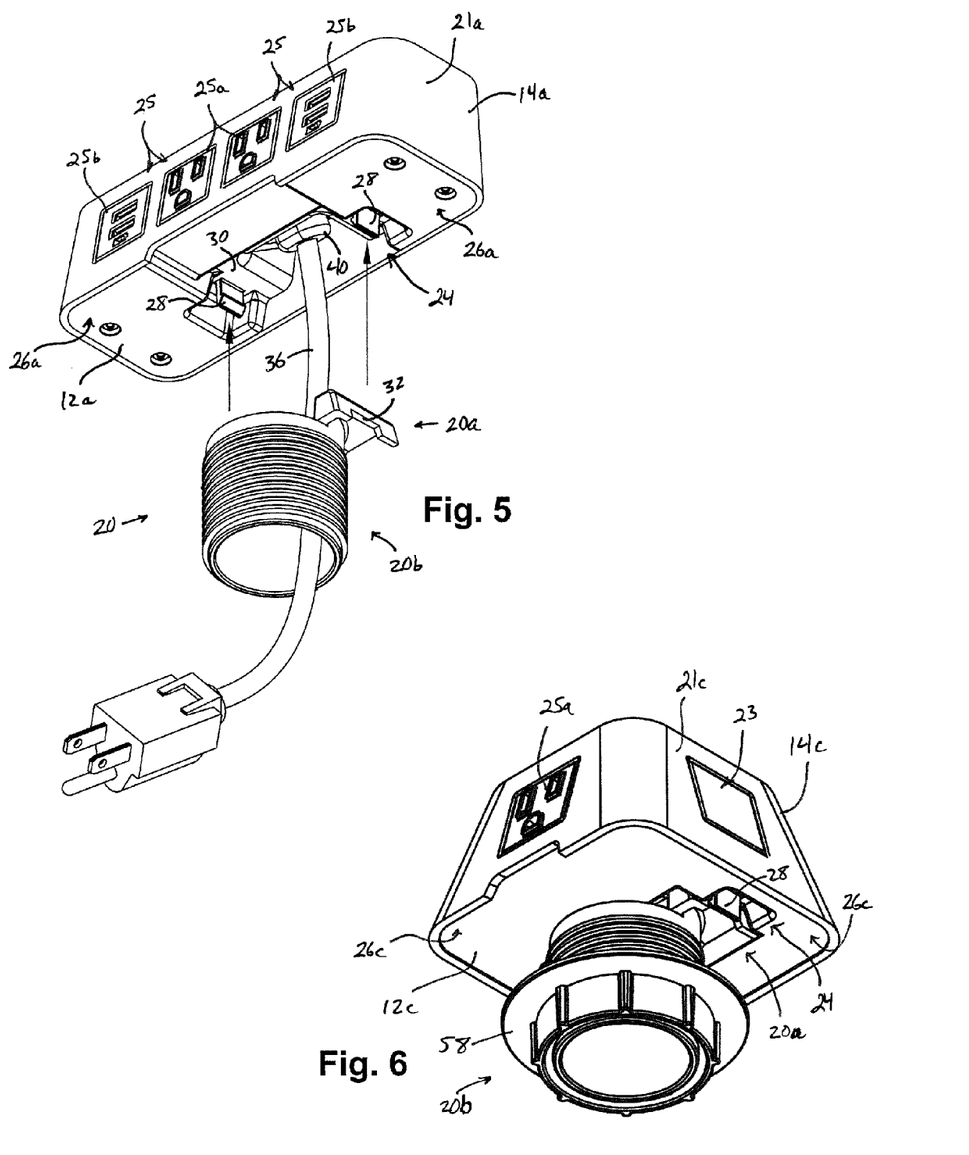
FIG. 5 is a partially-exploded bottom perspective view of the electrical power unit and hole-mount base of FIG. 3, in which the threaded base portion is being coupled to the electrical power unit.
FIG. 6 is a bottom perspective view of another electrical power unit, shown fitted with the hole-mount base of FIG. 3.
Figure 7:
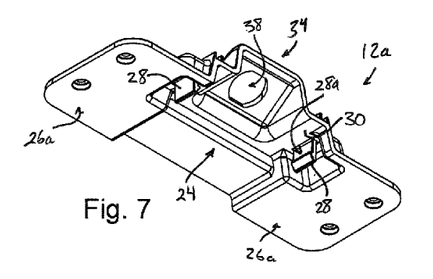
FIG. 7 is a bottom-rear perspective view of a base or bottom housing portion of the electrical power unit of FIGS. 1-3.
Figure 8:
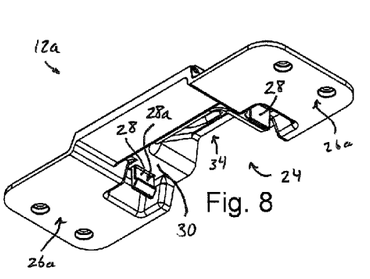
FIG. 8 is a bottom-front perspective view of the bottom housing portion of FIG. 7.
Figure 9:
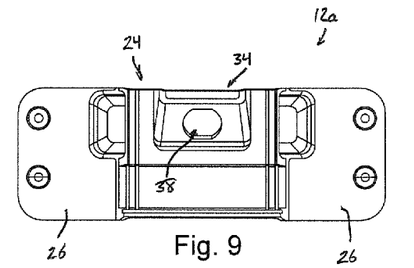
FIG. 9 is a top perspective view of the bottom housing portion of FIG. 7.
Figure 10:
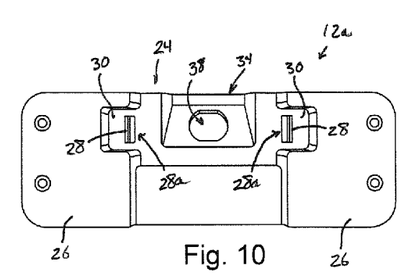
FIG. 10 is a bottom perspective view of the bottom housing portion of FIG. 7.

As shown in FIG. 5 and particularly in FIGS. 7-14, recessed receptacle or receiving portion 24 is unitarily formed as part of bottom housing portion 12a (and also may be unitarily formed as part of bottom housing portions 12b and 12c, such as shown in FIGS. 4 and 6), and is recessed above generally planar lower surface portions 26a-c of the respective bottom housing portions 12a-c. In the illustrated embodiment, the generally planar lower surfaces 26a-c are substantially flush with a lower edge portion of the corresponding sidewalls 21a-c, such as shown in FIGS. 1-3, 5, 6, 29-32, 38B, 38C, and 38E. This arrangement allows lower surface portions 26a-c to rest at or along the work surface to which the corresponding power unit 14a-c is mounted, and since receptacle portions 24 are recessed upwardly above the corresponding lower surface portions 26a-c, receptacle portions 24, and any proximal engaging portion (16a, 18a, 20a, 22a) that is received in the receptacle portion 24, will be obscured from view by users when the distal mounting portion (16b, 18b, 20b, 22b) is coupled to a work surface in a typical arrangement, since the sidewalls 21a-c laterally surround the sides of receptacle portions 24 and the work surface blocks substantially any view from below.

This presents a clean appearance upon installation, whereby only the power unit's sidewalls 21a-c, top wall, and electrical or data outlets 25 are normally visible to users, with mounts (16, 18, 20, 22) being entirely or substantially blocked from normal view. Even for those mounts 18, 22 that enable mounting to a vertical surface, the mounts themselves will typically be obscured from view by a generally horizontal work surface located directly below the power unit, and/or by the upper housing of the power unit.

Bottom housing portions 12a-c are sized to substantially cover the entire bottom of a given electrical unit of any size, while the size of the receptacle portion 24 remains substantially unchanged. Therefore, planar portions 26a of bottom housing portion 12a are made relatively large for the larger electrical unit 14a, while planar portions 26c of bottom housing portion 12c are relatively small for the smaller electrical unit 14c of FIG. 6, and planar portions 26b of bottom housing portion 12b are an intermediate size for the intermediate-sized electrical unit 14c of FIG. 4.

Figure 11:
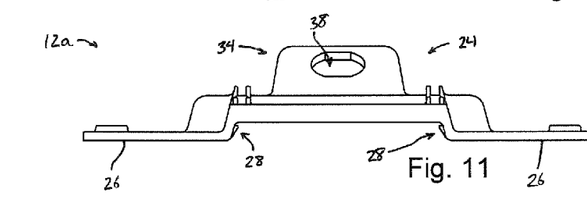
FIG. 11 is a front elevation of the bottom housing portion of FIG. 7.
Figures 12, 13, 14:
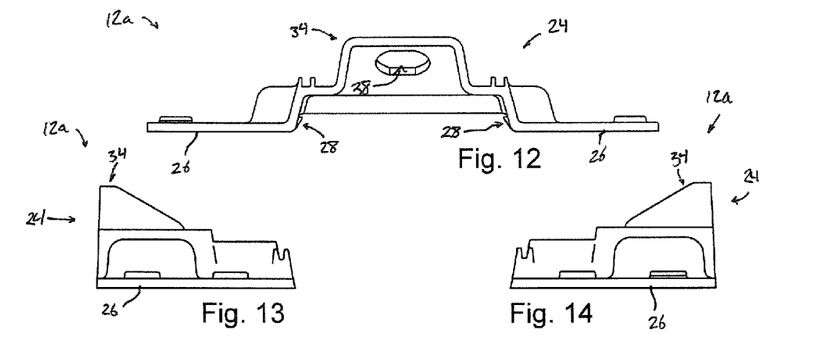
FIG. 12 is a rear elevation of the bottom housing portion of FIG. 7.
FIG. 13 is a right side elevation of the bottom housing portion of FIG. 7.
FIG. 14 is a left side elevation of the bottom housing portion of FIG. 7.
Figure 15:
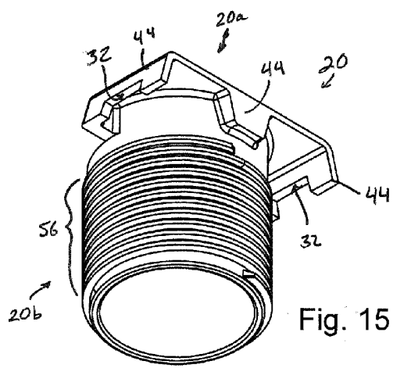
FIG. 15 is a bottom-rear perspective view of the threaded base portion of FIGS. 3, 5, and 6.
Figure 16:
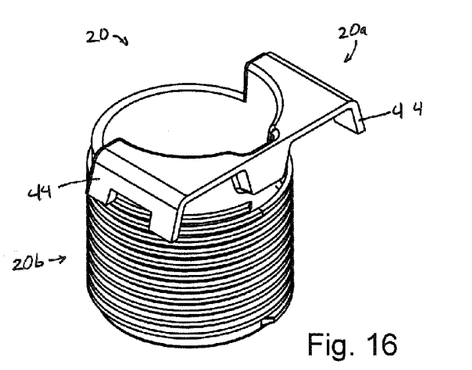
FIG. 16 is a top-rear perspective view of the threaded base portion of FIG. 15.
Figure 17:
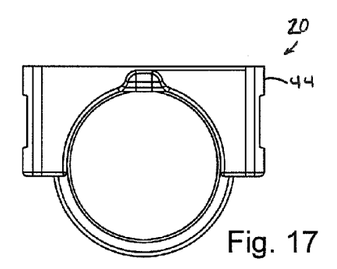
FIG. 17 is a top plan view of the threaded base portion of FIG. 15.
Figure 18:
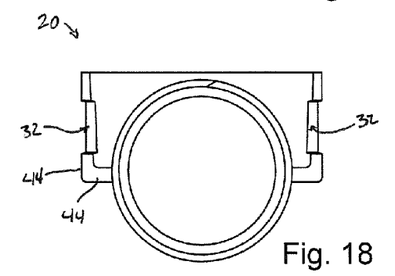
FIG. 18 is a bottom plan view of the threaded base portion of FIG. 15.
Figure 19:
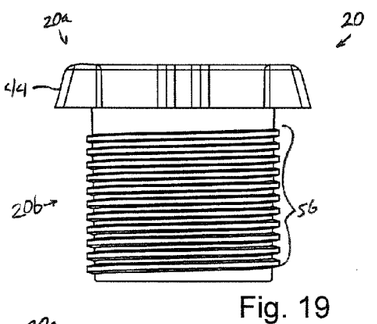
FIG. 19 is a front elevation of the threaded base portion of FIG. 15.
Figure 20:
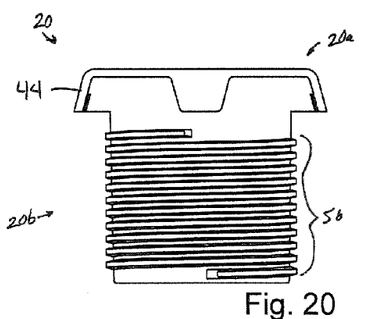
FIG. 20 is a rear elevation of the threaded base portion of FIG. 15.
Figure 21:
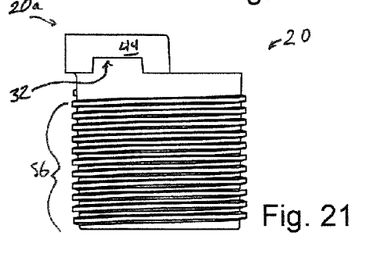
FIG. 21 is a right side elevation of the threaded base portion of FIG. 15.
Figure 22:
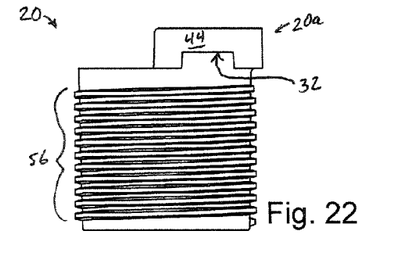
FIG. 22 is a left side elevation of the threaded base portion of FIG. 15.
Figure 23:
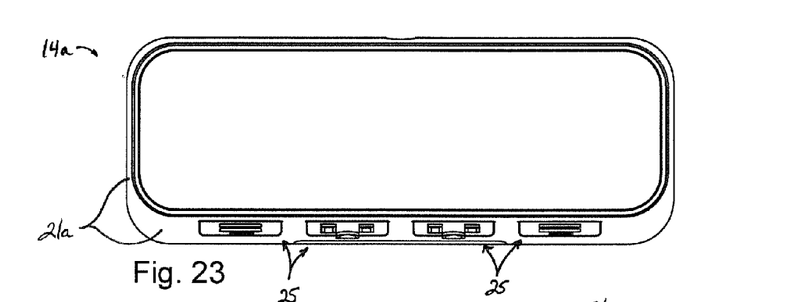
FIG. 23 is a top perspective view of the electrical power unit of FIG. 1.
Figure 24:
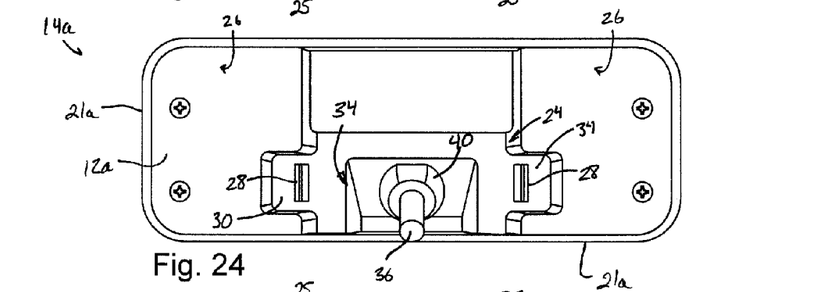
FIG. 24 is a bottom perspective view of the electrical power unit of FIG. 1.
Figures 25, 26, 27, 28:
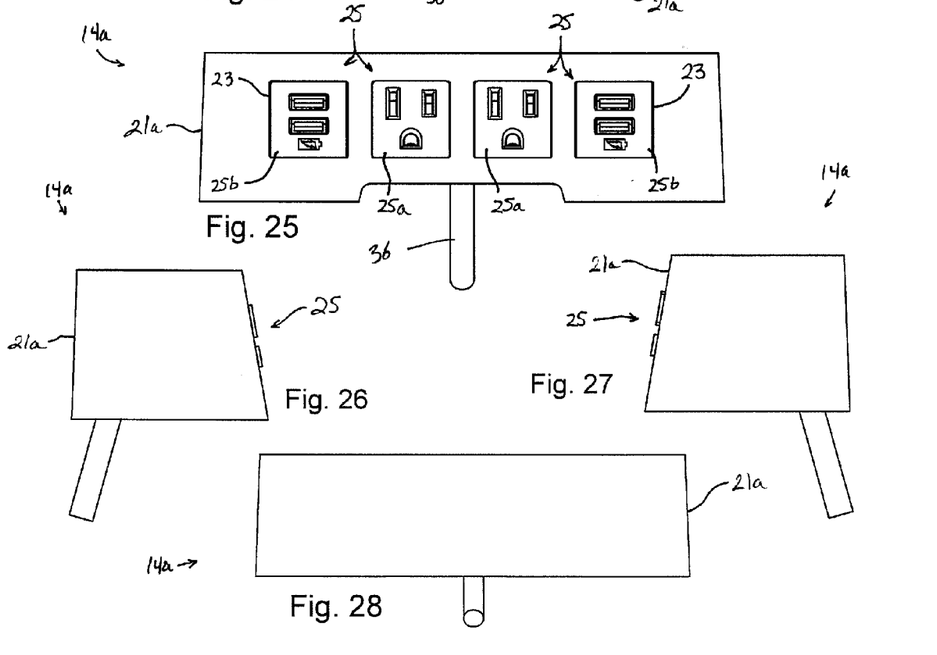
FIG. 25 is a front elevation of the electrical power unit of FIG. 1.
FIG. 26 is a right side elevation of the electrical power unit of FIG. 1.
FIG. 27 is a left side elevation of the electrical power unit of FIG. 1.
FIG. 28 is a rear elevation of the electrical power unit of FIG. 1.
Figure 29:
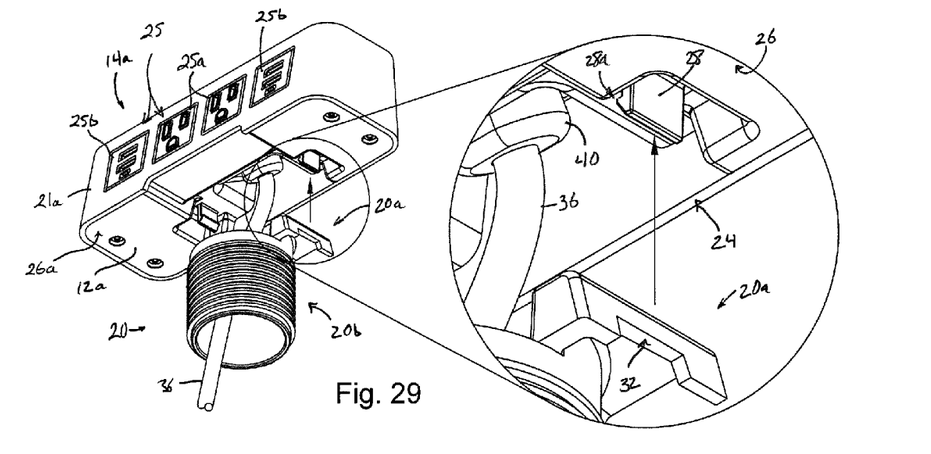
FIG. 29 is a bottom-front perspective view of the electrical power unit and hole-mount base similar to FIG. 5, and including an enlarged view of respective engagement portions, prior to engagement.
Figure 30:
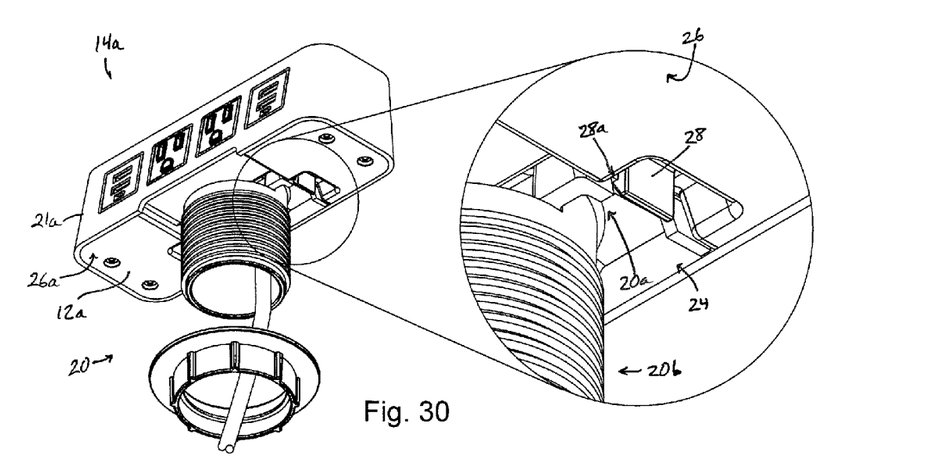
FIG. 30 is another bottom-front perspective view of the electrical power unit and hole-mount base of FIG. 29, shown fully engaged, and including an enlarged view of the respective engagement portions.
Figure 31:
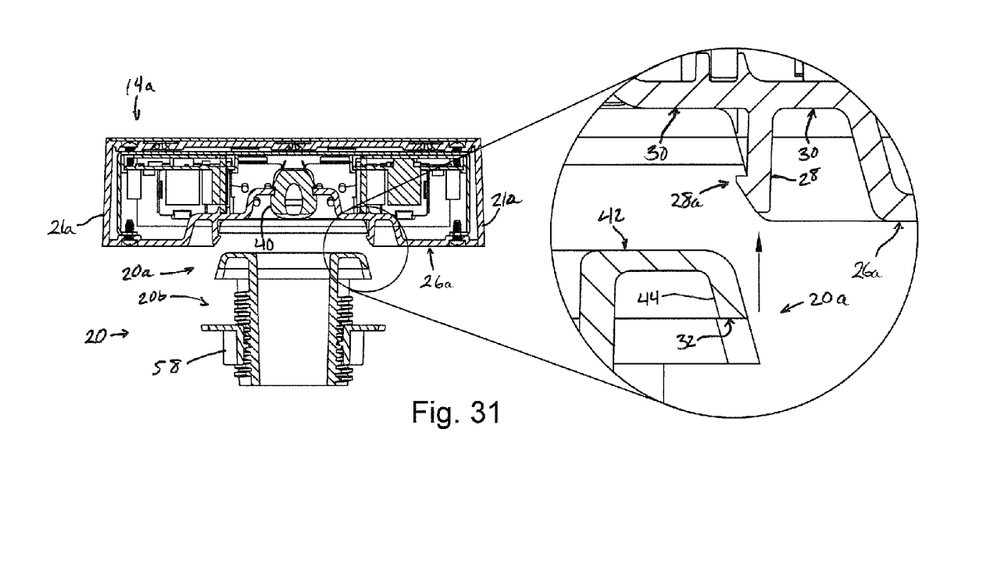
FIG. 31 is a front sectional elevation of the electrical power unit and hole-mount base of FIG. 29, and including a threaded collar on the hole-mount base.
Figure 32:
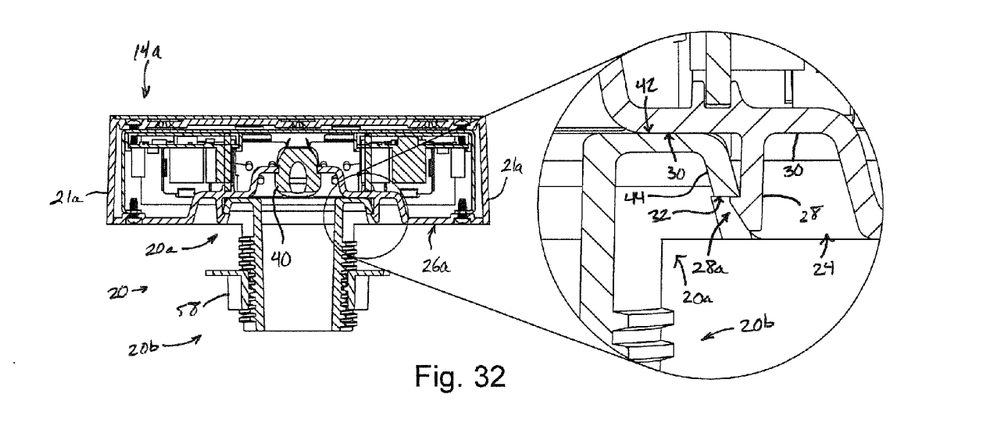
FIG. 32 is a front sectional elevation of the electrical power unit and hole-mount base of FIG. 30, and including the threaded collar on the hole-mount base.

Receptacle portions 24 each include a pair of resilient latch members 28 that project or extend downwardly from respective recessed shelves 30 (FIGS. 7 and 8), but as best shown in FIGS. 11 and 12, latch members 28 do not project below planar portions 26 of bottom housing portion 12a. Each latch member 28 has an inwardly-directed hook portion 28a (FIGS. 7, 8, and 10) that snaps into engagement with a respective latch surface 32 of the proximal engaging portion (16a, 18a, 20a, 22a) of each mount (16, 18, 20, 22), such as shown in FIGS. 29-32. Hook portions 28a may be disengaged from latch surfaces 32 for removal of a given mount (16, 18, 20, 22), by manually biasing latch members 28 outwardly, after which the proximal engaging portion (16a, 18a, 20a, 22a) of the mount (16, 18, 20, 22) may be pulled away from the receptacle portion 24 of bottom housing portion 12a-c. Optionally, substantially any type of securing device or hardware may be used to secure a given proximal engaging portion to receptacle portion 24, including threaded fasteners, hook-and-loop fasteners, magnets, or other readily-removable couplers. If a more permanent connection is desired, rivets, adhesives, heat welds, or the like may be used to secure a given mount (16, 18, 20, 22) to the receptacle portion 24.

It will be appreciated that, in the illustrated embodiments, the recessed receptacle portions 24, the latch members 28, and the proximal engaging portions (16a, 18a, 20a, 22a) are configured or arranged to permit linear insertion and full engagement of the proximal engaging portions with the receptacle portion when securing the desired mount (16, 18, 20, 22) to the bottom housing portion 12a-c. No pivoting or combined motions are required, and the latch members 28 may be simultaneously released by grasping the electrical unit 14a-c in the fingers, inserting both thumbs into the receptacle portion 24 to engage the latch members 28, and pulling outwardly on the latch members 28 to thereby bias them away from one another and out of engagement with latch surfaces 32.

Optionally, and as shown in the illustrated embodiments, receptacle portions 24 include wiring recesses 34 that provide clearance for wiring 36 to be routed past or around the proximal engaging portion (16a, 18a, 20a, 22a) of each mount (16, 18, 20, 22) when the mount is attached to the electrical unit, such as shown in FIGS. 1-5, 29, and 30. Wiring recess 34 defines an opening 38 through which wiring 36 is routed into electrical unit 14. Opening 38 may be fitted with a grommet 40 (FIGS. 5, 24, 29, 31, and 32) that protects wiring 36 from abrading on the edges of wiring recess 34 at opening 38, and that may also provide a strain relief for the wiring 36.

As noted above, each proximal engaging portion (16a, 18a, 20a, 22a) is substantially identical to the corresponding engaging portion of the other mounts, or is at least mechanically compatible with receptacle portion 24. For example, each proximal engaging portion (16a, 18a, 20a, 22a) includes latch surfaces 32 that are positioned in the same location on each engaging portion (16a, 18a, 20a, 22a), such as shown in FIGS. 31, 32, and 34-37. Each proximal engaging portion (16a, 18a, 20a, 22a) includes a generally planar top surface 42 that engages or lies in close proximity to recessed shelf 30 of receptacle portion 24 when the corresponding mount is coupled thereto, such as shown in the enlarged view of FIG. 32. Each proximal engaging portion may further have downwardly-extending sidewalls 44 that extend down from top surface 42, and that are generally sized and shaped to fit into the recessed receptacle portion 24 so as to provide added structural support. In the illustrated embodiments, portions of the sidewalls 44 define and terminate at respective ones of the latch surfaces 32, such as shown in FIGS. 31-37.

In contrast to the proximal engaging portions (16a, 18a, 20a, 22a), the distal mounting portions (16b, 18b, 20b, 22b) of the various mounts (16, 18, 20, 22) are different from one another, enabling a user to select a desired mount to secure the electrical unit 14 in a desired location and/or to a desired surface. For example, and with reference to FIGS. 1, 34, and 38A-38E, distal mounting portion 16b of work surface edge mount 16 includes a bracket portion 46 and a removable clamp portion 48 that is positionable at different locations (and in different orientations) along bracket portion 46 (FIGS. 38A-38E) to accommodate different thicknesses of work surface (as in FIGS. 33A-33C). Clamp portion 48 includes a generally L-shaped clamp member 48a that receives a thumbscrew 48b for tightening work surface edge mount 16 to the edge of a table, a desk, a wall panel, or even a ceiling tile, structural member, a floor panel, table leg, or the like.

Distal mounting portion 18b of wall mount 18 includes a generally planar bracket portion 50 that extends downwardly from top surface 42 of proximal engaging portion 18a, and has a plurality of holes or openings 52 (shown as keyhole openings in FIGS. 2 and 35) to receive respective screws 54 or other suitable mechanical fasteners, such as nails, rivets, or the like. It is also envisioned that bracket portion 50 could be secured to a wall or other generally upright surface (or even a horizontal or sloped surface) via adhesives, welding, hook-and-loop fastener, or substantially any suitable connection hardware or method.

Figure 33A:
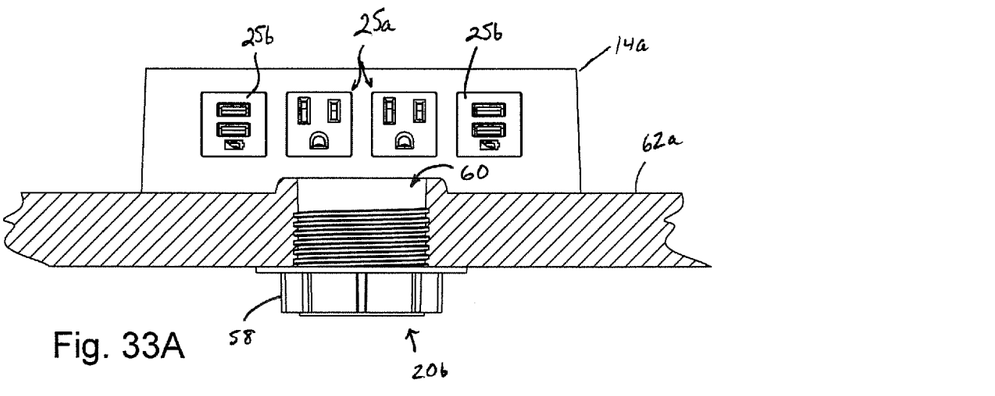
FIGS. 33A-33C are front elevations of the electrical power unit and hole-mount base of FIGS. 30 and 32, shown mounted to work surfaces of varying thickness.
Figure 33B:
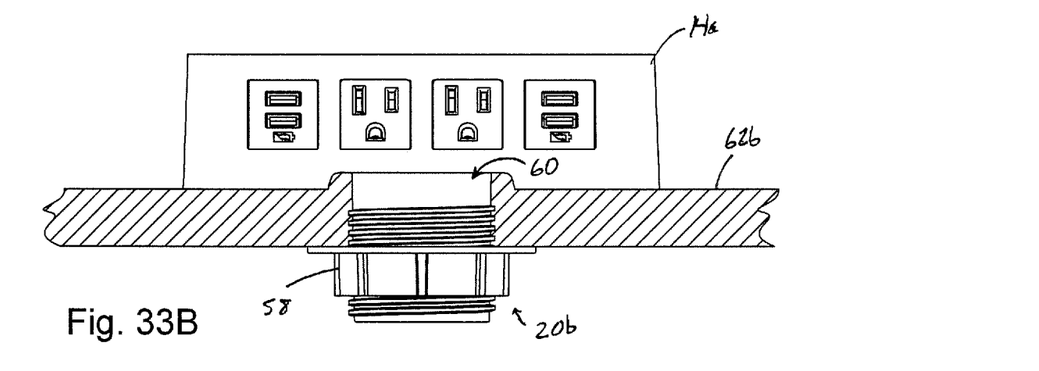
Figure 33C:
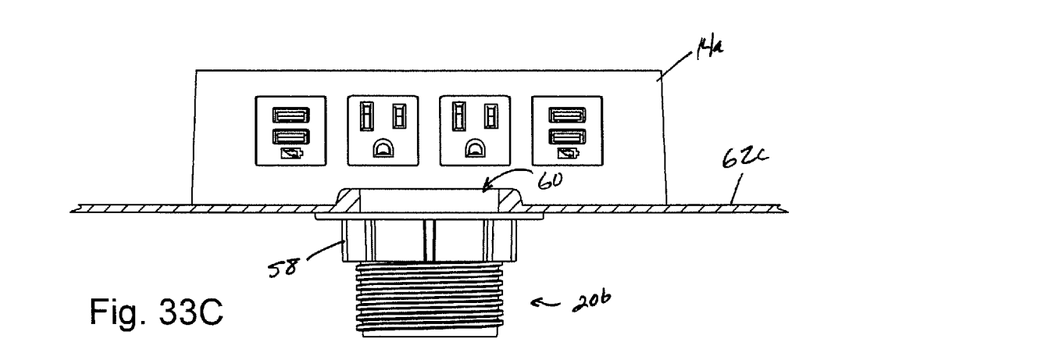
Figure 34:
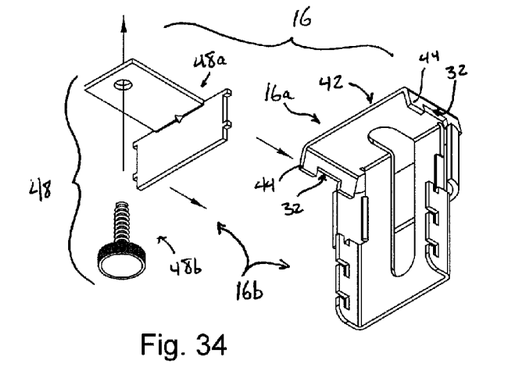
FIG. 34 is an exploded bottom-front perspective view of the edge-mount base of FIG. 1.

Distal mounting portion 20b of hole mount 20 has a male threaded region 56 (FIGS. 19-22) that is configured to receive a female threaded collar 58 (FIGS. 3, 6, and 29-33C), which is threaded onto male threaded region 56 and tightened to secure hole mount 20 (and the associated electrical unit 14) to a hole or opening 60 that is formed or established in a work surface 62a-c, such as shown in FIGS. 33A-33C. Collar 58 is adjustable along the length of male threaded region 56 to accommodate mounting the electrical unit 14 at a work surface having substantially any common thickness, ranging from the relatively thick surface 62a of FIG. 33A, to the medium-thickness surface 62b of FIG. 33B, to the relatively thin surface 62c of FIG. 33C.

Distal mounting portion 22b of channel mount 22 extends rearwardly and upwardly behind the electrical unit 14 to which channel mount 22 is attached, such as shown in FIGS. 4 and 37. Distal mounting portion includes a generally planar bracket portion 64 that extends upwardly and has a pair of generally L-shaped (in cross section) elongate projections 66 that are sized and shaped to be slidingly received in respective slot portions 68 of a generally C-shaped elongate channel 70, such as shown in FIG. 37. A plurality of C-shaped channels may be in vertically spaced arrangement along a mounting panel 72, as shown, which may be positioned in an upright orientation, or a horizontal or sloped orientation. Optionally, the orientation of the L-shaped projections 66 may be changed in order to achieve a desired orientation of the electrical unit 14.

It will be appreciated that distal mounting portions (16b, 18b, 20b, 22b) are merely illustrative examples of different types of mounting configurations or shapes or hardware that may be used, and it is envisioned that many other different types of mounting portions may be used without departing from the spirit and scope of the present invention. It will further be appreciated that other design variations are possible, also without departing from the spirit and scope of the present invention. For example, the interchangeable bases may be applied to electrical units having any one (or a combination of) a high voltage electrical power outlet, a low voltage electrical power outlet such as a universal serial bus (USB) outlet, a communications outlet, and an electronic data outlet. The interchangeable base system may further be applied to non-electrical systems or units. It is further envisioned that the portion of the housing that actually forms the receptacle portion may be a sidewall or top wall, and is not necessarily a "bottom" wall or housing portion. It is also envisioned that the receptacle portion may be a separate piece from the housing portion (such as a receptacle portion that attaches to a surface of the electrical unit housing, for example), and need not be unitarily formed with a portion or wall of the electrical unit or its housing(s).

Accordingly, the interchangeable mount or base system of the present invention provides a reconfigurable and readily customizable base or mount that is substantially interchangeable or replaceable at an electrical power and/or data unit. The system maximizes the number of mounting options available for a given unit, at relatively low cost and with little skill and little time required for reconfiguring a unit from one type of mount to another. A given electrical power and/or data unit may be fitted with a desired base simply by pressing and snapping the base into engagement with a receptacle portion of the power and/or data unit, and the base may later be separated from the power and/or data unit by releasing flexible latching tabs, such as shown, or other releasable securing devices. The mounted electrical power and/or data unit has a generally clean appearance in which the interfacing components or surfaces between the unit and its interchangeable base are completely or substantially hidden from view.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An interchangeable base system for use with an electrical power and/or data unit, said base system comprising:
   a bottom housing portion configured to form a lower portion of an electrical power and/or data unit, said bottom housing portion having a recessed receptacle portion that is surrounded on all sides by a plurality of sidewalls of the electrical power and/or data unit;
   first and second mounts that are interchangeably mountable to said bottom housing portion, said first and second mounts having respective proximal engaging portions and distal mounting portions, said proximal engaging portions configured to be received in said recessed receptacle portion of said bottom housing portion, wherein said distal mounting portion of said first mount is configured for a first type of attachment to a mounting surface and said distal mounting portion of said second mount is configured for a second type of attachment to the same or a different mounting surface, wherein the first type of attachment is different from the second type of attachment; and
   one or more latch members at said recessed receptacle portion, said one or more latch members configured to releasably secure either of said first and second mounts upon engagement of said proximal engaging portion in said recessed receptacle portion of said bottom housing portion;
   wherein when said distal mounting portion of said first or second mount is coupled to one of the mounting surfaces, and said proximal engaging portion of said first or second mount is secured at said recessed receptacle portion, said recessed receptacle portion and said proximal engaging portion are surrounded by the sidewalls of the electrical power and/or data unit.

2. The base system of claim 1, wherein said distal mounting portion of said first mount and said distal mounting portion of said second mount are configured for attachment to the first and second work surfaces chosen from (i) a substantially vertical wall, (ii) a work surface edge, (iii) an opening formed in a work surface, and (iv) an elongate channel.

3. The base system of claim 2, further comprising third and fourth mounts, each of said third and fourth mounts having a proximal engaging portion and a distal mounting portion, wherein said distal mounting portions of each of said first, second, third, and fourth mounts are configured for attachment to a respective one chosen from (i) a substantially vertical wall, (ii) a work surface edge, (iii) an opening formed in a work surface, and (iv) an elongate channel.

4. The base system of claim 1, wherein said bottom housing portion comprises a lower surface that is configured to rest at the mounting surface when said distal mounting portion of said first or second mount is coupled to the mounting surface.

5. The base system of claim 4, wherein said one or more latch members comprise resilient downwardly-extending projections that are configured to engage respective latch surfaces of said proximal engaging surfaces of said first and second mounts, and wherein said resilient latch members are configured to be manually biased to a disengaging position in which said resilient latch members disengage said respective latch surfaces.

6. The base system of claim 4, wherein said latch members are located entirely above said lower surface of said bottom housing portion, and are surrounded on all sides by the sidewalls of the electrical power and/or data unit.

7. The base system of claim 1, further in combination with the electrical power and/or data unit, said electrical power and/or data unit comprising at least one outlet chosen from (i) a high voltage electrical power outlet, (ii) a low voltage electrical power outlet, (iii) a communications outlet, and (iv) an electronic data outlet.

8. The base system of claim 7, wherein said at least one outlet is mounted at an opening formed in one of said sidewalls of said electrical power and/or data unit, and wherein said sidewalls are coupled to said bottom housing portion.

9. The base system of claim 1, wherein said recessed receptacle portion, said latch members, and said proximal engaging portions are configured to permit linear insertion and full engagement of said proximal engaging portions with said recessed receptacle portion when securing said first or second mount to said bottom housing portion.

10. An electrical power and/or data unit having an interchangeable base system, comprising:
    a housing having a bottom wall and a plurality of sidewalls extending upwardly from said bottom wall;
    at least one electrical power or data outlet mounted in said housing;
    said bottom wall defining a recessed receptacle portion that is surrounded laterally on all sides by said upstanding sidewalls;
    at least two mounts that are interchangeably mountable to said bottom wall, said mounts having respective proximal engaging portions and distal mounting portions, said proximal engaging portions configured to be received in said recessed receptacle portion, and said distal mounting portions configured differently from one another for engagement with different mounting surfaces; and
    a latch member at said recessed receptacle portion, said latch member configured to releasably secure either of said first and second mounts to said bottom wall upon engagement of said proximal engaging portion in said recessed receptacle portion;
    wherein when said distal mounting portion of said first or second mount is coupled to one of the mounting surfaces, and said proximal engaging portion of said first or second mount is secured at said recessed receptacle portion, said recessed receptacle portion and said proximal engaging portion are both laterally surrounded by said sidewalls.

11. The electrical power and/or data unit of claim 10, wherein said distal mounting portions of said at least two mounts are configured for attachment to respective different ones of the mounting surfaces chosen from (i) a substantially vertical wall, (ii) a work surface edge, (iii) an opening formed in a work surface, and (iv) an elongate channel.

12. The base system of claim 10, wherein said bottom wall comprises a lower surface that is configured to rest at the mounting surface when said distal mounting portion of one of said at least two mounts is coupled to the mounting surface.

13. The base system of claim 10, comprising two of said latch members in the form of resilient downwardly-extending projections that are configured to engage respective latch surfaces of said proximal engaging surfaces of said at least two mounts, and wherein said resilient latch members are configured to be manually biased apart from one another to respective disengaging positions in which said resilient latch members disengage said respective latch surfaces.

14. The base system of claim 10, wherein said at least one electrical power or data outlet comprises at least one chosen from (i) a high voltage electrical power outlet, (ii) a low voltage electrical power outlet, (iii) a communications outlet, and (iv) an electronic data outlet.

15. The base system of claim 14, wherein said at least one electrical power or data outlet is mounted at an opening formed in one of said sidewalls.

16. The base system of claim 10, wherein said recessed receptacle portion, said latch member, and said proximal engaging portions are configured to permit linear insertion and full engagement of said proximal engaging portions with said recessed receptacle portion when securing either of said at least two mounts to said bottom housing portion.

17. An electrical power and/or data unit having an interchangeable base system, comprising:
  a housing having a bottom wall and a plurality of sidewalls extending upwardly from said bottom wall;
  at least one electrical power or data outlet mounted in said housing;
  said bottom wall defining a recessed receptacle portion that is surrounded laterally on all sides by said upstanding sidewalls, said recessed receptacle portion including a downwardly-extending latch member;
  at least two mounts configured to be interchangeably coupled to said bottom wall, said mounts having respective proximal engaging portions and distal mounting portions, said proximal engaging portions configured to be received in said recessed receptacle portion and engaged by said latch member, and said distal mounting portions configured differently from one another for engagement with different mounting surfaces;
  wherein said recessed receptacle portion, said latch member, and said proximal engaging portions are configured to permit linear insertion and full engagement of said proximal engaging portions with said recessed receptacle portion when securing either of said at least two mounts to said bottom housing portion; and
  wherein when said distal mounting portion of said first or second mount is coupled to one of the mounting surfaces, and said proximal engaging portion of said first or second mount is secured at said recessed receptacle portion, said recessed receptacle portion and said proximal engaging portion are both laterally surrounded by said sidewalls.

18. The electrical power and/or data unit of claim 17, wherein said distal mounting portions of said at least two mounts are configured for attachment to respective different ones of the mounting surfaces chosen from (i) a substantially vertical wall, (ii) a work surface edge, (iii) an opening formed in a work surface, and (iv) an elongate channel.

19. The electrical power and/or data unit of claim 18, wherein said distal mounting portion of a first of said mounts comprises a clamp for attachment to a work surface edge and said distal mounting portion of a second of said mounts comprises a male threaded portion and a threaded collar for attachment to an opening formed in a work surface, and wherein said bottom wall comprises a lower surface that is configured to rest at the work surface when said distal mounting portion of said first or second mount is coupled to the work surface.

20. The electrical power and/or data unit of claim 19, wherein one of said sidewalls defines an opening configured to provide access to said at least one electrical power or data outlet, and said at least one electrical power or data outlet comprises at least one chosen from (i) a high voltage electrical power outlet, (ii) a low voltage electrical power outlet, (iii) a communications outlet, and (iv) an electronic data outlet.

* * * * *